United States Patent Office 3,436,022
Patented Apr. 1, 1969

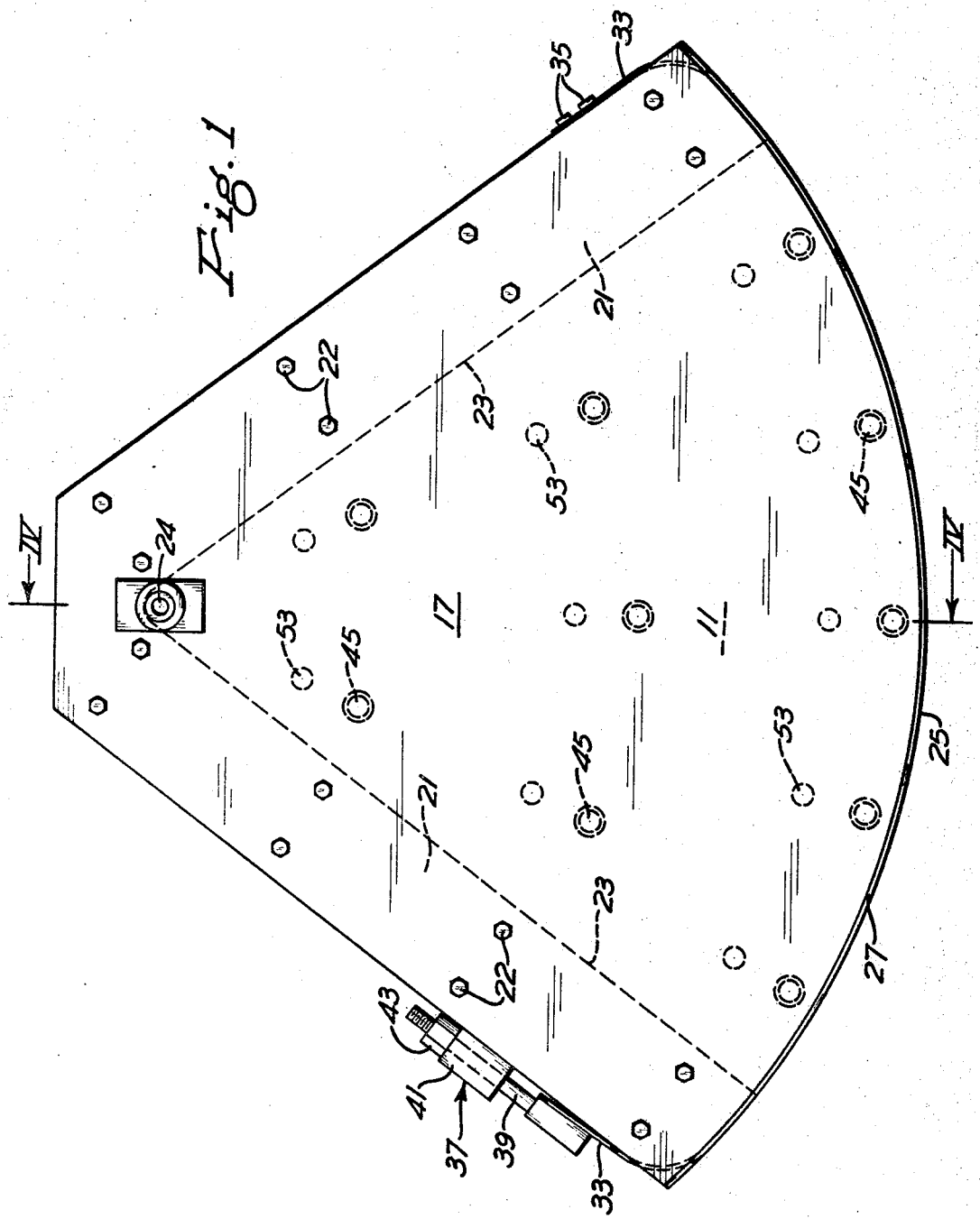

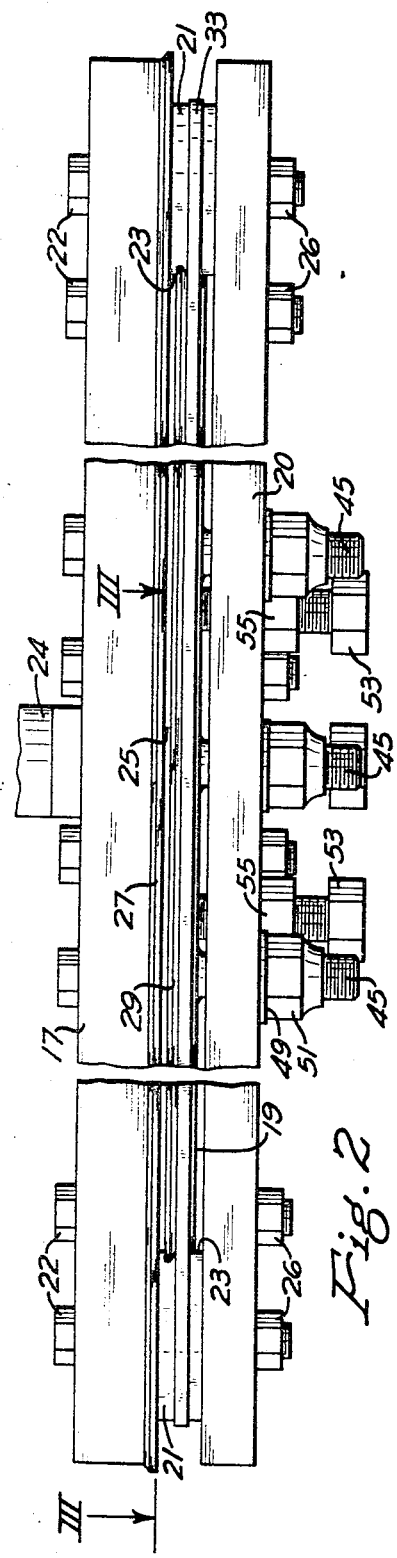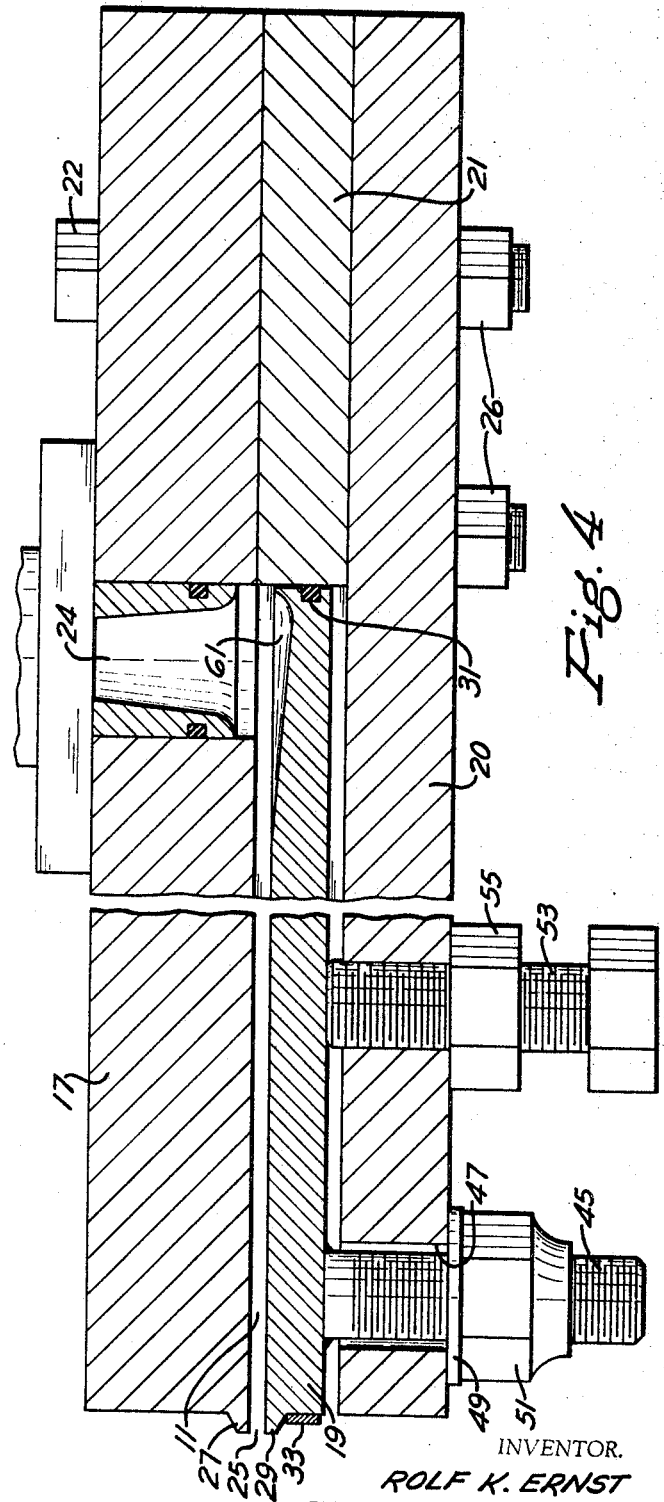

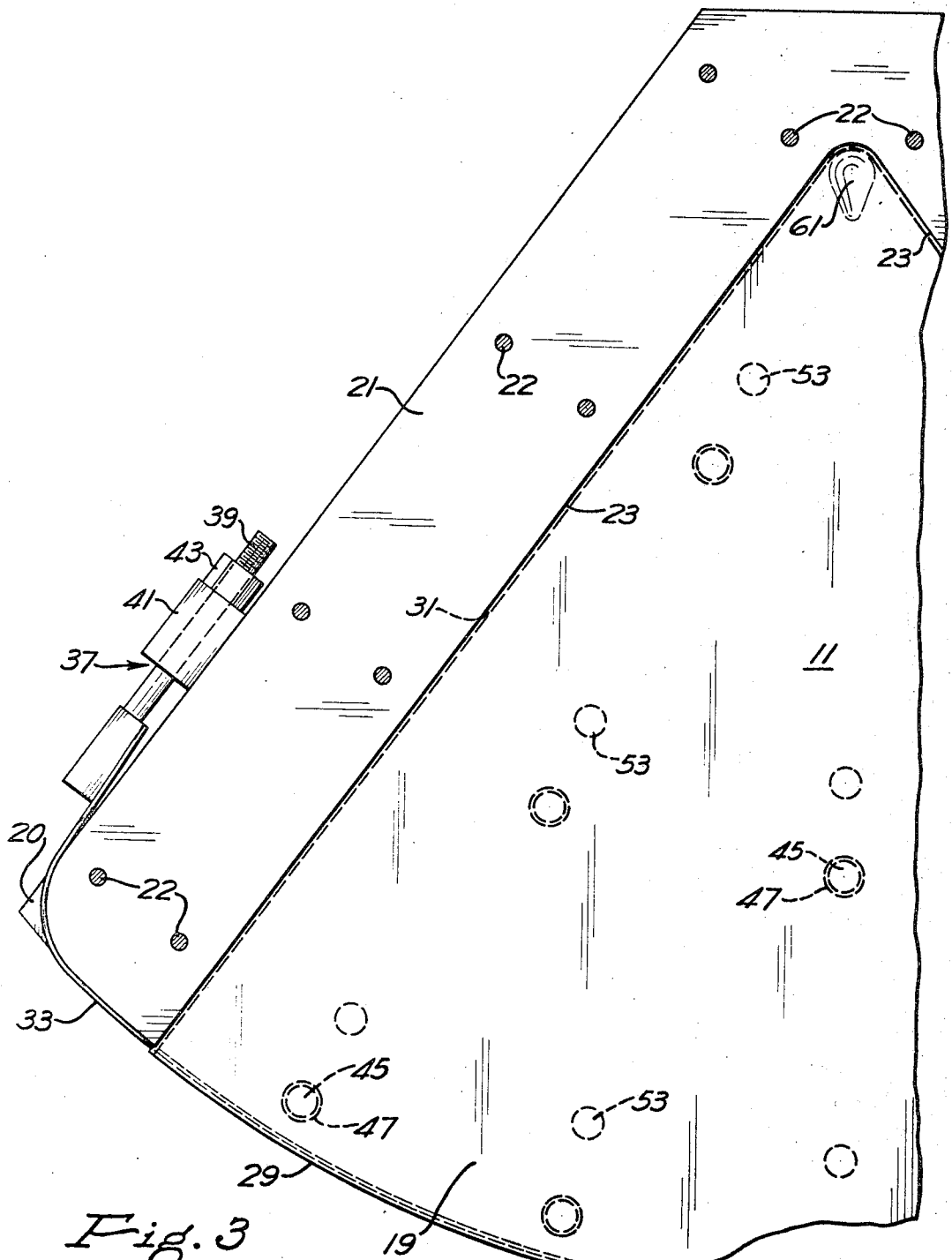

3,436,022
FILM COATING APPARATUS
Rolf K. Ernst, Konigswinter-Siegkreis, Germany, assignor, by direct and mesne assignments, of one-half to Maschinenfabrik Karl Hennecke, Birlinghoven, Germany, and one-half to Mobay Chemical Company, Pittsburgh, Pa., a corporation of Delaware
Filed Dec. 9, 1966, Ser. No. 600,623
Int. Cl. B05b 1/30, 1/00
U.S. Cl. 239—455        8 Claims

ABSTRACT OF THE DISCLOSURE

Apparatus for depositing a thin film of liquid comprises a sector-shaped chamber formed from a top planar surface and a bottom planar surface in close proxmity to said top surface, the chamber having an inlet at its apex and an outlet along its circumference.

---

This invention relates to an apparatus for applying a thin uniform film of a material to a substrate. More particularly, the invention relates to a distributing apparatus suitable for applying a reactive mixture in a uniform thickness to a surface.

It has been heretofore known in the coating industry to apply uniform thickness coating by an apparatus commercially referred to as a curtain coating machine. This machine operates on the fundamental principle that a continuous liquid uniform thickness film of the coating composition is applied by permitting the liquid material to pass through an elongated outlet in the lower end of a reservoir. This in effect, is a chamber having a slit in the bottom thereof which permits a uniform liquid film to be deposited upon the surface moving beneath the curtain coater. This apparatus is highly effective for its intended purpose, however, it is useless when highly reactive chemicals which react with each other upon contact to form a polymer are employed. Such reactive chemicals cannot be maintained in a reservoir in an unreacted state and therefore, the curtain coating type apparatus cannot be employed.

In preparation of polyurethane plastics, for example, highly reactive chemicals are used to prepare the polymers. These chemicals, upon contact with each other, begin reacting substantially immediately. Where it is desired to apply a thin coating, such as in the coatings industry or in the preparation of a cellular polyurethane having a uniform height, various methods have been used. In the preparation of cellular polyurethanes, for example, a mixing apparatus is employed which distributes the reactive mixture onto a conveyor moving beneath the surface of the mixer. In order to achieve a uniform height cellular polyurethane, two techniques can be employed.

The first involves a series of height control means which engaged the foam after it begins to rise. Such means are disadvantageous because any contact with the foam once it begins to rise causes some compression of the cells and therefore, a loss of uniformity in cross-section is observed. The second technique to obtain a uniform thickness cellular polyurethane is to apply a uniform thickness layer of reacted material to substrates. Thus, upon the blowing of the cellular polyurethane, the material will rise to a uniform height. In theory, this is the most beneficial technique because no compression of the foam at any stage during the rise takes place. However, in practice, an apparatus for dispersing in a uniform thickness layer of highly reactive material across a wide conveyor has not been available.

It is an object of this invention to provide an apparatus for applying a uniform layer of a liquid material. It is another object of this invention to provide an apparatus for distributing a thin uniform film of a highly reactive mixture of chemicals. It is still another object of this invention to provide an apparatus which will apply a uniform liquid film to a surface moving beneath the apparatus.

The foregoing objects and others which will become apparent from the following description taken in conjunction with the accompanying drawings are accomplished, generally speaking, by providing an apparatus for deposting a uniform thin film of liquid onto a substrate which includes a chamber having a substantially sector-shaped cross-section, side walls along the two radii forming the sector-shape, a top planar surface and a bottom planar surface in close proximity to the top surface and substantially parallel thereto, an inlet to said chamber substantially at the point of intersection of the two side walls and a discharge outlet running the length of the arc of the sector-shape.

The apparatus of this invention will be more apparent in conjunction with the accompanying drawings in which like reference characters indicate the like parts and in which:

FIGURE 1 is a plan view of an apparatus in accordance with this invention;

FIGURE 2 is a front elevation view of the apparatus of FIGURE 1;

FIGURE 3 is a sectional view taken along the lines III—III of FIGURE 2; and

FIGURE 4 is a sectional view taken along the lines IV—IV of FIGURE 1.

In apparatuses for applying a uniform film of a reactive liquid mixture, difficulty has arisen because at different points of discharge of the distributing device, reaction has not progressed to the same degree because of the distance traveled by different portions of the reactants. Thus, as the reactive mixture is discharged from the apparatus, different degrees of the reaction have taken place along the length of the film being applied. This is due to the different residence time within the apparatus of the different particles of the reactive mixture. For this reason, a uniform film, which in the case of preparing a cellular polyurethane is required, has not been achieved.

The apparatus in accordance with this inveniton overcomes this deficiency because each particle of reactive material entering the distributing apparatus moves substantialy an equal distance from the point of entry to the point of discharge.

The apparatus in accordance with this invention is essentially two sector-shaped planar plates arranged substantially parallel to each other and in close proxmity and sealed around the edges of the radii and at the apex formed by the intersection of the radii and having an inlet substantially at the apex and a discharge along the arc of the sector-shape. By this arrangement, all of the liquid ingredients entering the inlet must move substantially along a radius to the outlet which is an arc of the circumference of a circle.

FIGURE 1 illustrates a plan view of an apparatus in accordance with this invention, the apparatus having a substantially fan shaped configuration. Considering the different views shown, the distribution chamber 11 is defined by parallel closely spaced top and bottom plates 17 and 19 and V-shaped spacer bar 21, a portion of which forms the sides 23 of the chamber 11. An inlet 24 is positioned in top plate 17 substantially at the center of the arc which forms the outlet 25. The outlet 25 is a narrow slit formed by the top plate 17 and bottom plate 19 and runs the total length of the arc from one leg of the V-shaped spacer bar 21 to the other. The sides 23 of spacer bar 21 which are also the sides of chamber 11, each lie on a radius extending from the center of the circle of which the outlet arc 25 is a portion. Thus, any liquid material entering the inlet 24 must flow substantially along a radius until it is discharged from the arc-like outlet 25. The outlet 25 is in the form of lips 27 and 29 provided on plates 17 and 19 respectively. These lips 27 and 29 prevent the liquid material from striking back on the apparatus and thereby permitting the formation of a uniform thin film which exits from the outlet 25.

The distance between parallel plates 17 and 19 may be either fixed or adjustable. In an apparatus where the distance is fixed, the sides 23 of spacer bar 21 are intimately joined to the plates 17 and 19 by welding or other suitable techniques. It is preferred, however, that the apparatus be adjustable in order that the space between parallel plates 17 and 19 and also, the opening of the discharge outlet 25 can be altered in order to accommodate different rates of flow through the apparatus. This also permits disassembly in order to clean the device. FIGURES 1 through 4 illustrate a means for rendering the apparatus adjustable. In the apparatus as illustrated, plate 19, which is the lower plate of the distribuiton chamber 11 is movable with respect to plate 17. This is accomplished by the addition of a third plate 20 which is fixed to the V-shaped spacer bar 23 and thereby to plate 17 by means of bolts 22 and nuts 26. Plate 19 fits into the V of spacer bar 21 and is sealed in liquid tight relation therewith by rubber gasket 31 disposed along the radial sides of plate 19 which bears against the sides 23 of spacer bar 21. The rubber gasket 31 surrounding plate 19 is held under compression by forcing the plate 19 against the spacer bar 21 by means of a steel band 33 fastened on one side of the spacer bar 21 by means of bolts 35. The band 33 passes around the arc face of plate 19 beneath lip 29 and again fastens on the opposite side of the spacer bar 21 by a tightening means 37 comprising a bolt 39 attached to the band 33 a protuberance 41 attached to the spacer bar 21 and having a bore therethrough and a nut 43. By tightening down on nut 43, plate 19 is moved toward the apex of the V-shaped spacer bar 21 thereby maintaining the rubber gasket 31 in the deformed condition.

The plate 19 has welded to the underside thereof, a series of studs 45 which extend through apertures 47 in the lower plate 20. Washers 49 and nuts 51 are threaded onto studs 45. Bolts 53 are threaded through lower plate 20 and bear against the underside of plate 19. Each bolt 53, in addition, carries an adjusting nut 55. The effect of bolts 45 and 53 and nuts 51 and 55 is to work against each other thus fixing the position of plate 19 with respect to plate 17. By altering the position of bolts 45 and 53 and nuts 51 and 55, the distance between the two plates 17 and 19 can be adjusted within close tolerances.

In operation, a suitable mixing device such as, for example, one illustrated in Reissue Patent 24,514 is positioned immediately above and is in fluid-flow relationship with the inlet 24. The liquid reactive mixture flows through the inlet and immediately encounters a scooped out portion 61 in the plate 19 which is generally fan-shaped in the same nature as that of the chamber 11. The mixed material immediately passes along radii until it is discharged by flowing over the lip 29 which is an integral part of plate 19. Depending upon the rate of flow of mixed reactants into the inlet 24, the adjusting bolts 45 and 53 and nuts 51 and 55 are tightened or loosened in order to achieve a uniform thin film of reactive mix exiting from the discharge outlet 25.

Although the invention has been described in considerable detail in the foregoing for the purpose of illustration, it is to be understood that such detail is solely for this purpose and that variations can be made by those skilled in the art.

What is claimed is:

1. An apparatus for depositing a thin film of liquid which comprises a chamber having a sector-shaped cross-section formed by two radii and the arc joining said radii, said chamber having a substantially planar top surface and a substantially planar bottom surface substantially parallel to and in close proximity to said top surface, said chamber having an inlet substantially at the apex of said sector and a continuous outlet of constant width running the length of said arc.

2. The apparatus of claim 1 wherein one of said top and bottom surfaces is adjustable with respect to the other.

3. The apparatus of claim 2 wherein the bottom surface is disposed between the top surface and an adjusting surface, said adjusting surface being secured to said top surface by a V-shaped spacer bar which is complementary in shape to said bottom surface, said bottom surface fitting within the V of said V-shaped spacer bar, the edges of said bottom surface and the edges of said spacer bar being in liquid tight relation, said adjusting surface being provided with means for moving said bottom surface with respect to said top surface and holding said two surface by a V-shaped spacer bar which is complementary 4. The apparatus of claim 1 wherein said continuous outlet is formed by a pair of lips comprising a first lip on said planar top surface and a second lip on said planar bottom surface.

5. The apparatus of claim 4 wherein one of said top and bottom surfaces is adjustable with respect to the other.

6. The apparatus of claim 5 wherein the bottom surface is disposed between the top surface and an adjusting surface, said adjusting surface being secured to said top surface by a V-shaped spacer bar which is complementary in shape to said bottom surface, said bottom surface fitting within the V of said V-shaped spacer bar, the edges of said bottom surface and the edges of said spacer bar being in liquid tight relation, said adjusting surface being provided with means for moving said bottom surface with respect to said top surface and holding said two surfaces in the desired position.

7. The apparatus of claim 6 wherein the edges of said bottom surface and the edges of said spacer bar are held in liquid tight relation by a band fastened on one side of the spacer bar, said band passing around the arc face of the bottom surface beneath the lip and being fastened on the opposite side of the spacer bar by a tightening means.

8. The apparatus of claim 3 wherein the edges of said bottom surface and the edges of said spacer bar are held in liquid tight relation by a band fastened on one side of the spacer bar, said band passing around the arc face of the bottom surface beneath the lip and being fastened on the opposite side of the spacer bar by a tightening means.

References Cited

UNITED STATES PATENTS 3,383,054   5/1968   Nugarus _____ 239—597

FOREIGN PATENTS 1,007,304   10/1965   Great Britain.

M. HENSON WOOD, Jr., *Primary Examiner.*

H. NATTER, *Assistant Examiner.*

U.S. Cl. X.R.

239—597, 600, 601